2,980,734

THIOPSEUDOUREA DERIVATIVES

Milton Kosmin, Dayton, Ohio, assignor to Monsanto Chemical Company, St. Louis, Mo., a corporation of Delaware No Drawing. Filed Mar. 10, 1959, Ser. No. 798,320

4 Claims. (Cl. 260—564)

The present invention relates to organic compounds of sulfur and more particularly provides certain new derivatives of thiopseudourea.

According to the invention there are provided certain new and valuable 2-[2-(alkylmercapto)ethyl]-2-thiopseudourea hydrohalides by the reaction of a 2-(alkylmercapto)ethyl halide with thiourea substantially according to the scheme:

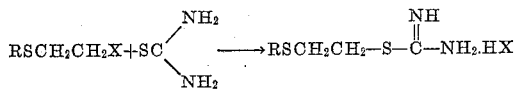

in which R is an alkyl radical of from 8 to 18 carbon atoms and X is halogen.

2-[2-(alkylmercapton)ethyl] - 2 - thiopseudoureas provided by the present invention, are, e.g., 2-[2-(n-octylmercapto)ethyl]-2-thiopseudourea hydrobromide from thiourea and 2-(n-octylmercapto)ethyl bromide, 2-{2-[(2-ethylhexyl)mercapto]ethyl}-2-thiopseudourea hydrochloride from thiourea and 2-[(2-ethylhexyl)mercapto] ethyl chloride and thiourea, 2-[2-(tert-nonylmercapto) ethyl]-2-thiopseudourea hydroiodide from 2-(tert-nonylmercapto)ethyl iodide and thiourea, 2-[2-(n-decylmercapto)ethyl]-2-thiopseudourea hydrochloride from 2-(n-decylmercapto)ethyl chloride and thiourea, 2-[2-(n-decylmercapto)ethyl] - 2 - thiopseudourea hydrobromide from 2-(n-dodecylmercapto)ethyl bromide and thiourea, 2-{2-[(2 - n - propylheptyl)mercapto]ethyl}-2-thiopseudourea hydrochloride from 2-[(2-n-propylheptyl)mercapto] ethyl chloride and thiourea, 2-{2-[(2,6,8-trimethylnonyl) mercapto]ethyl} - 2 - thiopseudourea hydroiodide from 2-[(2,6,8-trimethylnonyl)mercapto]ethyl iodide and thiourea, 2-[2-(kerylmercapto)ethyl]-2-thiopseudourea hydrochloride (wherein the keryl radical denotes the mixture of alkyl radicals corresponding to the hydrocarbons of kersosene) from 2-(kerylmercapto)ethyl chloride and thiourea, 2-[2-(tridecylmercapto)ethyl]-2-thiopseudourea hydrochloride (wherein the tridecyl radical is derived from an alcohol prepared according to the "Oxo" process from carbon monoxide, hydrogen and either butylene trimer or propylene tetramer) from the corresponding 2-(tridecylmercapto)ethyl chloride and thiourea, 2-[2-(n-octadecylmercapto)ethyl]-2-thiopseudourea hydrobromide from 2-(octadecylmercapto)ethyl bromide and thiourea, etc.

Reaction of the 2-(alkylmercapto)ethyl halides with thiourea to give the present thiopseudourea derivatives is effected at ordinary or increased temperatures and in the presence or absence of an inert solvent or diluent. Advantageously, the present compounds are prepared by contacting the halide with the thiourea in the presence of an unreactive solvent such as ethanol, dioxane, hexane, acetone, etc., and temperatures of from, say, 50° C. to the refluxing temperature of the reaction mixture are used. Inasmuch as the reaction involves addition of one mole of the halide to one mole of the thiourea, these reactants are advantageously employed in stoichiometric proportions. However, an excess of either reactant may be employed since any unreacted initial material may be easily recovered from the final product.

The present 2-[2-(alkylmercapto)ethyl]-2-thiopseudourea hydrohalides are well-defined, stable compounds which generally range from crystalline to waxy solids. They are particularly valuable as fungicides. They may also be advantageously employed as insecticides and bactericides and as pesticides in general.

The invention is further illustrated, but not limited, by the following examples:

*Example 1*

To a 500 ml. flask fitted with a reflux condenser there were charged 62.6 g. (0.3 mole) of 2-(tert-octylmercapto)ethyl chloride, 22.8 g. (0.3 mole) of thiourea and 200 ml. of 95% ethanol as solvent. The resulting solution was refluxed for six hours and then allowed to stand overnight without further heating. The excess of solvent was removed from the resulting reaction mixture under water pump vacuum and absolute alcohol was added to the residue. The whole was then poured into an ethanol-hexane mixture, from which there was obtained crystals of the substantially pure 2-[2-(tert-octylmercapto)ethyl]-2-thiopseudourea hydrochloride, M.P. 156–157.5° C. (corr.). It was soluble in ethanol and somewhat soluble in hexane and in water.

*Example 2*

Operating as in Example 1, but using 79.5 g. (0.3 mole) of 2-(tert-dodecylmercapto)ethyl chloride instead of the 2-(tert-octylmercapto)ethyl chloride of Example 1, there was obtained the white, waxy 2-[2-(tert-dodecylmercapto)ethyl]-2-thiopseudourea hydrochloride, soluble in hexane, water, ether, ethanol and hexane.

*Example 3*

A mixture consisting of 39.75 g. (0.15 mole) of 2-(n-dodecylmercapto)ethyl chloride and 14.4 g. (0.15 mole) of thiourea in 100 ml. of 95% ethanol was refluxed for 6 hours. After standing overnight at room temperature and subsequent cooling by means of an ice-salt bath the reaction product began to crystallize. In order to increase crystallization, an equal volume of hexanol was added. The crystals thus formed were filtered and washed three times with hexane and three times with ethyl ether. Upon drying there was obtained white, waxy, platelike crystals of the substantially pure 2-[2-(n-dodecylmercapto)ethyl]-2-thiopseudourea hydrochloride, M.P. 104° C.

*Example 4*

The 2-[2-(n-dodecylmercapto)ethyl]-2-thiopseudourea hydrochloride of Example 3 was tested against the fungus *Aspergillus niger*. The following procedure was used:

An inoculum preparation of *Aspergillus niger* was prepared by adding 10 ml. of sterile distilled water to a 7-day old, Sabouraud's dextrose agar slant culture thereof and dislodging the organisms into the water with a transfer needle.

Culture media was prepared by respectively adding 18 ml. of Sabouraud's dextrose agar to 18 x 150 mm. straight side test tubes, capping with metal culture tube caps, and sterilizing in an autoclave for fifteen minutes at 121° C.

A stock solution of the test compound was prepared by dissolving 100 mg. of said test compound in 10 ml. of acetone; a 1% acetone solution of the compound was thus obtained.

Using a sterile 5 ml. pipette, 2 ml. of said 1% solution was transferred to a tube of melted, sterile culture media prepared as described above. A dilution of 1 part of test compound per 1,000 parts of agar resulted. Duplicates were prepared for the test compound and also duplicate "controls" consisting of the 18 ml. of agar and 2 ml. of acetone. The contents of the tubes were then poured into respective sterile Petri dishes and allowed to harden. Two tubes of the culture media, containing no chemical, were also respectively poured into sterile Petri dishes and allowed to harden; these were also to be used for "controls."

The plates of agar were then respectively inoculated with one drop of the above-described inoculum preparation. Examination of the plates after a five-day incubation period showed no growth of the *Aspergillus niger* in either of the duplicate plates which contained the test compound, i.e., the 2-[2-(n-dodecylmercapto)ethyl]-2-thiopseudourea hydrochloride, whereas profuse growth of the *Aspergillus niger* was noted in both sets of "controls," i.e., the duplicate inoculated plates which contained no chemical and duplicated inoculated plates which contained the acetone but no other chemical.

The present thiopseudourea derivatives retard fungus growth on plants, fruits, seeds, soils, furs, leather, cotton, wood and organic material in general. They may be applied directly to the organic material which is to be treated, but because the 2-[2-(alkylmercapto)ethyl]-2-thiopseudourea hydrohalides are effective in extremely dilute concentrations, it is preferred to incorporate them with a carrier or a diluent. Solutions of said hydrohalides may be employed in the absence of any dispersant; however, for many purposes the addition of a dispersing agent is preferred in that better adhesion or penetration of the treating solution is obtained. As dispersing agents there may be used, e.g., alkali metal salts of higher alkyl sulfosuccinates, the higher alkylbenzenesulfonates, polyalkylene glycol ethers of long chained alcohols, etc. Impregnation of textiles with the present thiopseudourea derivatives is advantageously effected by immersion in solutions of these compounds in the presence or absence of a wetting-out agent.

Fungistatic dusts may be prepared by mixing the present salts with dusting materials such as talc, clay, lime, bentonite, pumice, fuller's earth, etc.

This application is a continuation-in-part of my copending application, Serial No. 611,762, filed September 24, 1956, now abandoned.

What I claim is:

1. A 2-[2-(alkylmercapto)ethyl]-2-thiopseudourea hydrochloride in which the alkyl radical has from 8 to 18 carbon atoms.

2. 2-[2-(tert-octylmercapto)ethyl] - 2 - thiopseudourea hydrochloride.

3. 2-[2-(n-dodecylmercapto)ethyl] - 2 - thiopseudourea hydrochloride.

4. 2-[2-(tert-dodecylmercapto)ethyl]-2-thiopseudourea hydrochloride.

References Cited in the file of this patent
UNITED STATES PATENTS 2,302,762     Graenacher et al.        Nov. 24, 1942

OTHER REFERENCES

Von E. Doering et al.: J.A.C.S., volume 77, pages 514–523 (1955).